United States Patent [19]

Stiller et al.

[11] 3,743,389

[45] July 3, 1973

[54] COMBINATION MIRROR AND TRANSPARENT CASE THEREFOR

[76] Inventors: William B. Stiller, 1142 Greenvale Avenue; Michael R. Stiller, 709 Hidden Valley Road, both of Akron, Ohio

[22] Filed: Apr. 10, 1972

[21] Appl. No.: 242,590

[52] U.S. Cl. .................................. 350/288, 206/38
[51] Int. Cl. ............................................. G02b 5/08
[58] Field of Search................... 350/283, 288, 290, 350/305; 40/219; 206/37, 38, 39, 45, 31, 33

[56] References Cited
UNITED STATES PATENTS

| | | | |
|---|---|---|---|
| 3,216,135 | 11/1965 | Wright | 206/38 R |
| 3,056,180 | 10/1962 | Gink | 206/37 |
| 2,709,945 | 6/1955 | Kuhn | 350/283 |

FOREIGN PATENTS OR APPLICATIONS

| | | | |
|---|---|---|---|
| 545,921 | 6/1942 | Great Britain | 206/38 |

Primary Examiner—David Schonberg
Assistant Examiner—Michael J. Tokar
Attorney—Freeman & Taylor

[57] ABSTRACT

A product that includes a mirror and a case specifically adapted to receive the same, with the case being made of soft vinyl material of sufficient thickness to protect the mirror during normal periods of use, and with the case being preferably translucent so that the reflective qualities of the mirror can enhance the aesthetic appearance of the case when the mirror is received therein.

An additional feature is the optional use of a humorous slogan imprinted on the case exterior and being complimentary to the user of the mirror and case.

3 Claims, 4 Drawing Figures

PATENTED JUL 3 1973  3,743,389

3,743,389

COMBINATION MIRROR AND TRANSPARENT CASE THEREFOR

BACKGROUND OF THE INVENTION

FIELD OF THE INVENTION

Mirrors have long been used by persons for cosmetic and other purposes, and further, mirrors have often been provided in a relatively small size so as to be capable of being carried within the purse or pocketbook of a woman, for example.

It is further well known that mirrors have a great aesthetic value, and they are attractive to the eye.

In the past because of the delicate nature of the mirror and its susceptibility to scratching and the like, users of small mirrors have inevitably carried them in a protective pouch, with such pouches being opaque by their very nature. In the instance of the use of cloth pouches, which has been the most prevalent instance of prior use known to the Applicant, little true protective value is afforded to the mirror by the pouch which does not serve to protect the mirror against damage if the same is dropped onto a hard surface or if a hard surface is brought into contact with it inadvertently.

Thus, in the past pouches for mirrors have served little other purpose than to serve as an instrument within which the same may be received and transported.

SUMMARY OF THE INVENTION

It has been discovered that if small pocket-type mirrors are combined with a specially designed carrier or case for the same, the inherent aesthetic characteristics of each component will be unexpectedly increased as a result of the aforesaid combination.

Specifically when the mirror is cased within a translucent plastic case of the type hereinafter to be described, not only will the mirror be protected, but it has been found that the mirror will give off an attractive reflection that is different from the normal reflection normally given off by a mirror in ordinary use.

Likewise, when the translucent case has a mirror positioned therein, the exterior appearance thereof is improved by the presence of the mirror interiorly thereof.

Finally, it has been found that when the exterior of the case is imprinted with a slogan that is complimentary to the user thereof, the same will have enhanced appeal from a sales and aesthetic standpoint.

Production of an improved mirror and case of the type above-described accordingly becomes the principal object of this invention, with other objects of the invention becoming more apparent upon a reading of the following brief specification, considered and interpreted in view of the accompanying drawings.

OF THE DRAWINGS

Figure 1:
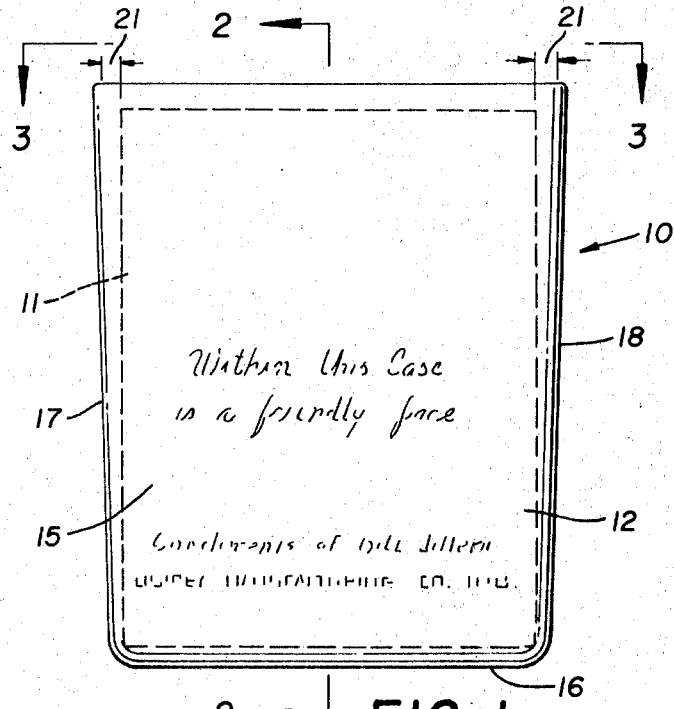
FIG. 1 is an elevational view looking at the front of the case and showing the mirror provided therein in chain-dotted line position.
Figure 3:
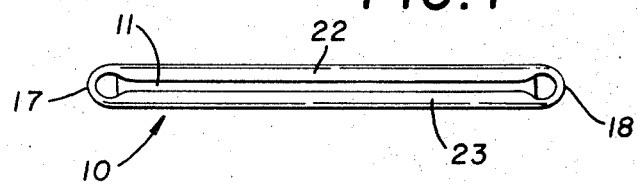
FIG. 3 is a top plan view taken on the lines 3—3 of FIG. 1.
Figure 4:
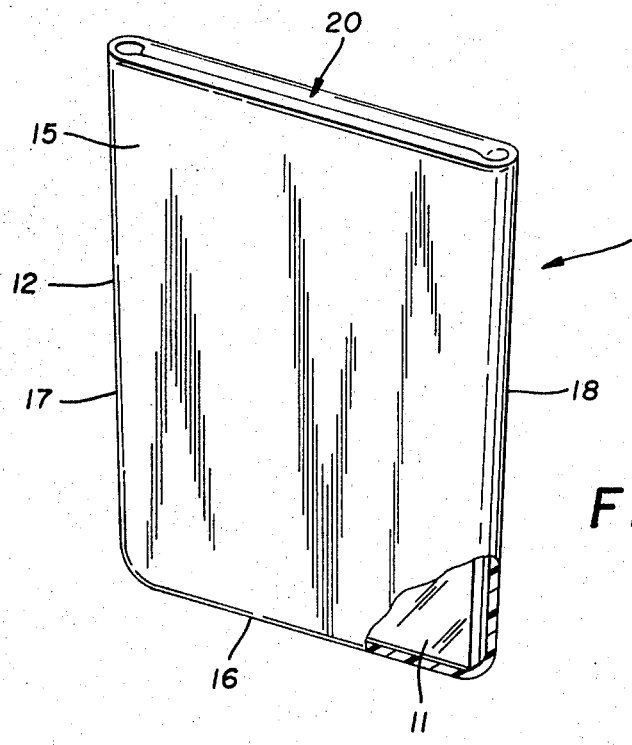
FIG. 4 is a perspective view of the improved combination mirror and case therefor.

Referring now to the drawings and in particular to FIGS. 1 and 4 thereof, the improved mirror and case therefor is generally designated by the numeral 10 and includes a mirror 11 and a one-piece case 12 that is designed to envelop and protect the same while having its own aesthetic appearance enhanced by the presence of the mirror 11 interiorly thereof.

In practice, the mirror 11 has preferably been provided with a mirror surface on one face thereof, with the remaining face thereof being non-reflective. In practice a mirror having the measurements of 2 ¾ inches height by 2 ¼ inches width and one-sixteenth inch thickness has been found to be satisfactory for use in women's purses.

As indicated above, the case is made of one-piece seamless type construction so as to be thin and flat in nature for the purpose of receiving the mirror snugly therein as shown in the drawings. In this regard the case is preferably made of polyvinyl chloride or similar material by use of a dipping process, with this arrangement producing integral opposed faces 14 and 15 that merge into a bottom wall 16, and opposed sidewalls 17 and 18 that integrally define the confines of the case.

This dipping process will result in the exterior walls being relatively smooth to present a pleasing appearance. However, in the preferred form of the invention, the interior walls of the case 12 are frosted so as to constitute a surface that is provided with irregularities defined by minute interstices, with this surface condition being achieved by sand-blasting or otherwise treating the dipping mold so that the surface thereof is irregular to thus produce an irregular surface on the interior of the case 12.

The purpose of this is twofold. First, the same hides any scratches or imperfections that may exist on the mirror or that may have been transferred from the dipping form. Secondly, it prevents the mirror from sticking to the interior of the case, with it being noted that the reflective surface of the mirror 11 will slide freely across the interior surfaces while sticking or adhering to the outside surfaces.

For the purpose of imparting transparency to the wall portions, a polyvinyl admixture having a low color pigment content will be employed, with this arrangement permitting the case, in view of its relatively thin wall sections, to be translucent upon being in contact with the mirror when the same is received within the case.

From an aesthetic viewpoint it will be observed that an entirely different appearance is obtained when the face 14 is viewed with the mirror-reflective surface behind the same that will be the case when the reverse face of the case is examined with the dull and unfinished surface of the mirror in contact therewith.

Figure 2:
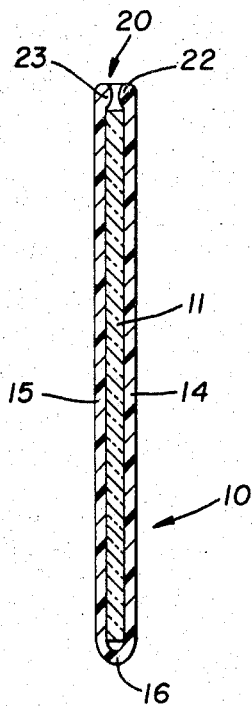
FIG. 2 is a vertical section taken on the lines 2—2 of FIG. 1.

It will also be noted that the opposed sidewalls 17 and 18 taper outwardly from each other towards the mouth opening 20, with this being done to create a space 21,21 adjacent the mouth opening so that opposed finger pressure on this will serve to flex the sidewalls 14 and 15 to a concave or convex position whereby the fingers of the user may be inserted therein for mirror removal purposes. Opposed ribs 22 and 23 are provided on the walls 14 and 15 respectively in the mouth-opening area for the purpose of retaining the mirror 11 in place within the case 12 as best shown in FIG. 2 of the drawings.

While the thickness of the case can vary, it will be noted that the same is generally uniform throughout, and it will further be noted that the thickness should be sufficient to provide a cushioning protection for the mirror 11 when the same is received therein. In practice, a wall thickness of one-sixteenth inch has been found satisfactory, with the similar spacing of approximately one-sixteenth inch or slightly greater being provided between the walls 14 and 15 for reception of the mirror as shown in FIG. 2.

Again referring to FIGS. 1 and 4, it will be noted that the face 14 preferably has provided thereon an imprinted slogan that is designed to personalize the product for the user thereof. Typical slogans that have been found to enhance the sales and aesthetic appearance of the product include "Within this case is a friendly face", "Look inside and meet a friend of ours", and other such slogans which serve to personalize the product with respect to the user and render a personalized product that is suitable for use as a gift item in the field of advertising specialties.

The use of the mirror case is believed to be relatively apparent from the foregoing description, but in use the sidewalls 17 and 18 will be moved towards each other in the area of the mouth opening so as to distort the flat surfaces 14 and 15 into a position where the mirror can be grasped by the hand of the user and removed from the case. Following use, the reverse procedure is employed for reinserting the mirror within the case, and it will be noted that when inserted in the case, the mirror is, in effect, locked within the same by virtue of the construction featuring the ribs 22 and 23.

While a full and complete description of the invention has been set forth in accordance with the dictates of the Patent Statutes, it is to be understood that the invention is not intended to be limited to the specific embodiment herein shown.

Accordingly, modifications of the invention may be resorted to without departing from the spirit hereof or the scope of the appended claims.

What is claimed is:

1. A combination mirror and case for the same comprising;
   A. a rectangular mirror having a mirror surface on at least one face thereof;
   B. a unitary translucent mirror case
      1. made of translucent, flexible polyvinyl chloride;
      2. having opposed flat wall surfaces that are interconnected by opposed edges and closed end edge whereby a mirror case having a mirror-receiving cavity and a mouth opening is defined;
      3. the dimensions of said case slightly exceeding the dimensions of said mirror whereby said mirror may be snugly enveloped within said wallet;
      4. said opposed edge surfaces of said case tapering outwardly from said closed end edge to said mouth opening whereby the width of said mouth opening slightly exceeds the width of said mirror;
      5. said mouth opening being transversely spreadable for mirror ingress and egress purposes upon the application of finger pressure to said opposed edges in the region of said mouth opening; and
      6. the interior surfaces of said mirror case being frosted so as to constitute irregular surfaces that contact the faces of said mirror when the same is received in said case.

2. The combination mirror and case of claim 1 further characterized by the fact that the mouth opening of said case is provided with a pair of opposed ribs that close off said mouth opening when the same is in its normal position.

3. The combination mirror and case of claim 1 further characterized by the fact that said mirror and each of said wall surfaces are of substantially equal thickness.

* * * * *